Nov. 18, 1969  L. R. LOVELOCK ET AL  3,479,204
EPOXIDE RESIN SEALS
Filed Oct. 4, 1965  2 Sheets-Sheet 1
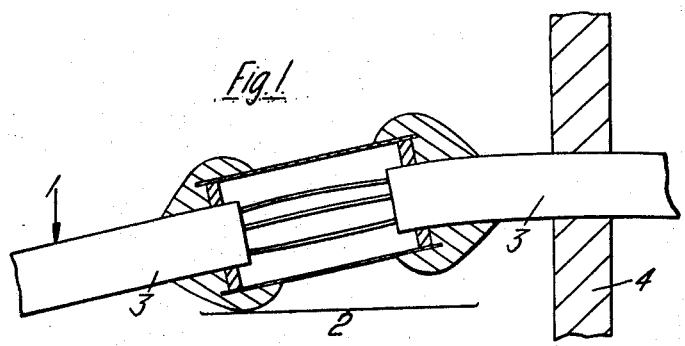
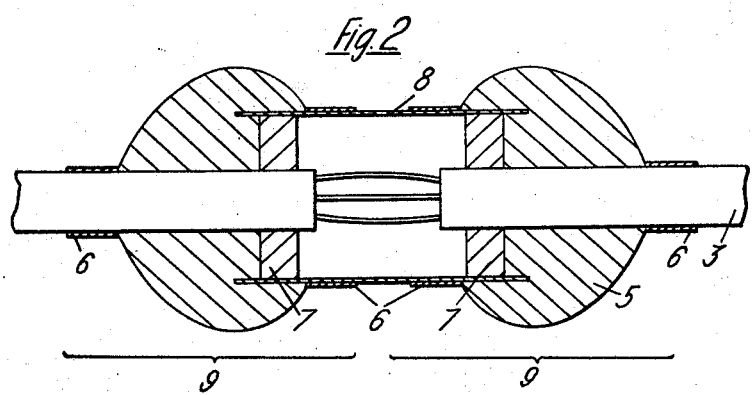
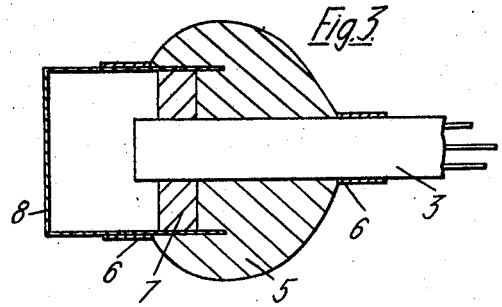
Inventors
LEONARD R. LOVELOCK
KENNETH R. WAY
ROBERT H. WREN
By
Attorney

United States Patent Office 3,479,204
Patented Nov. 18, 1969

3,479,204
EPOXIDE RESIN SEALS
Leonard Robert Lovelock, Kenneth Richard Way, and Robert Henry Wren, Aldwych, London, England, assignors to International Standard Electric Corporation, New York, N.Y., a corporation of Delaware
Filed Oct. 4, 1965, Ser. No. 492,590
Claims priority, application Great Britain, Nov. 6, 1964, 45,298/64
Int. Cl. B44d 1/14, 1/28
U.S. Cl. 117—46                                              19 Claims

ABSTRACT OF THE DISCLOSURE

A moisture retardant seal is formed on a surface by treating the surface to chemically bond with a primer, applying the primer including an epoxide resin and curing agent, applying a putty to said primer including a second epoxide resin and curing agent, and then curing both said resins.

---

This invention relates to methods of making moisture retarding seals at surfaces of bodies and to epoxide resin systems therefor. By "epoxide resin system" is meant an epoxy resin with its curing agent, with or without fillers and plasticizers. In particular an object is to provide a two-part epoxide resin seal with a good peel resistance when applied to polyethylene.

In the following specification the word "flexible" is to be interpreted as meaning "elastically deformable under the influence of applied forces within the limits of which the bond between the surface and the epoxide resin systems applied thereto has a good resistance to said forces tending to peel the applied resin systems away from the said surface."

According to one aspect of the present invention, there is provided a method of bonding a filled-epoxide putty to a portion of the surface of a body, comprising the steps of treating the portion to render it capable of chemically bonding to a primer to be applied thereto, applying the primer to the treated surface portion, said primer being a first mixture of an epoxide resin and a curing agent for that resin, said resin being such that it is flexible when cured, applying the putty to the primed surface portion, and then and only then permitting or causing said primer to be cured.

According to one refinement of the present invention, means are provided to achieve adhesion of an epoxide resin putty to polyethylene by flame-polishing the surface of the polyethylene and applying a flexible epoxide resin thereto.

According to a particular feature of the present invention, there is provided a method of making a seal to retard the ingress of moisture into a cable, comprising the steps of preparing the surface of the cable to render it capable of bonding to an epoxide resin system, priming the said surface with an epoxide resin system, which system is flexible when cured, and before the curing of said flexible epoxide resin system applying thereto an epoxide resin putty, and then causing both resin systems to be cured.

According to another aspect of the present invention, a moisture-retarding seal with a surface-portion of a body is provided by a pair of epoxide resin systems, wherein the first epoxide resin system of said pair comprises a mixture of an epoxide resin and curing agent for that resin, said first system being such that it is flexible when cured, and the second epoxide resin system of said pair comprises a mixture of said first or a second epoxide resin, a curing agent for that resin and fillers, the constituents of such second epoxide resin system being so proportioned that it is initially in a plastic state.

The invention will now be particularly described by way of examples with reference to the accompanying drawings in which:

FIG. 1 illustrates a test which provided an indication of the strength of a joint to the sheath of a cable;

FIG. 2 is an axial section through a cable joint made according to the present invention;

FIG. 3 is an axial section through a seal at the end of a cable made according to the present invention.

Figure 4:
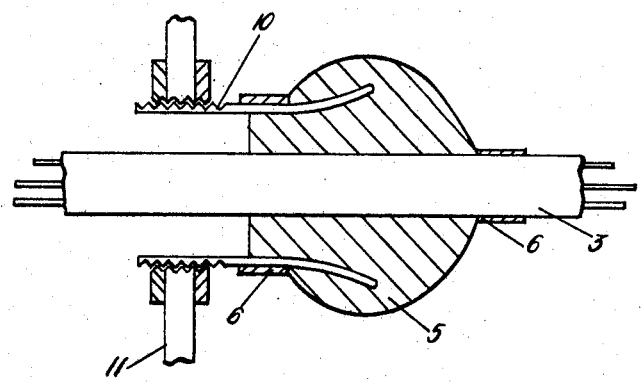
FIG. 4 is an axial section through a seal between a cable and a cable termination box made according to the present invention.

It has been found empirically that the effectiveness of a cable joint can be related to the performance of that joint in the test illustrated by FIG. 1. A joint 2 is made between two portions 3 of a cable, one of which is held firmly in a clamp 4. A force 1 applied to the cable in such a way as to apply a bending stress to the joint, which tends to make the joint peel away from the sheath of the cable. The resistance to peeling the seal between the jointing material and the sheath is a measure of the strength of the joint.

According to one example of the present invention a seal to a polyethylene sheathed cable is provided by the following method.

The surface of the polyethylene sheath is rendered receptive to the application of a first epoxide resin system by means of flame polishing for a brief period.

The purpose of the flame polishing is to modify the surface properties of the polyethylene sheath to render it capable of chemically bonding to a primer to be applied thereto whereas a longer heat treatment causes changes in the bulk structure of the sheath material, such as may give rise to latent strains resulting eventually in failure of the joint.

Suitable protection for a joint in a polyethylene sheathed cable may be provided by a length of polyethylene tube 8, shown in FIG. 2. The outer and inner surfaces of this tube are flame polished in a similar manner to the cable sheath.

Spacers 7 are built up a short distance from the ends of the cable sheaths 3 by winding paper tape until the diameter of the spacers is equal to the internal diameter of the polyethylene tube 8.

The polyethylene tube is then slipped over the two spacers, to a position in which the tube extends beyond both spacers.

The primer epoxide resin system is prepared by mixing together a resin consisting of a modified diglycidyl ether of bisphenol-A containing a reactive diluent to reduce the viscosity, and example of such a commercially available material being known as "Epikote" 816 a registered trademark of the Shell Chemical Corp., a hardener comprising a liquid polyoxy alkylene polysulphide such as "Thiokol" LP3 a registered trademark of the Thiokol Chemical Co. and an accelerating agent comprising a modified aliphatic amine such as "Epikure" T another registered trademark of the Shell Chemical Corp. The primer is then applied to the previously treated polyethylene surfaces.

An epoxide resin putty is prepared by mixing a resin comprising a diglycidyl ether of bisphenol-A such as "Epikote" 828 a registered trademark of the Shell Chemical Corp., a thixotropic silica filler, alumina, furfuryl alcohol and polyethylene glycol with a hardener comprising a polyamide curing agent such as "Versamid" 115 or 125 a registered trademark of the General Mills Corp., a modified aliphatic amine such as "Epikure" T, a non-leafing-type aluminum powder, thixotropic silica filler and alumina. The proportions of the various fillers are chosen to increase the viscosity of the material and to give it a consistency similar to that of lead when heated to have the degree of plasticity suitable for wiped joints. This degree of plasticity should not exceed that at which the lead would sag under its own weight while a joint is being made or allowed to cool. The same requirements of plasticity apply to the putty, which must be of such a mixture that its plasticity readily permits a wiped joint to be made without any risks of sagging during the curing process in the course of which the mixture should preferably become relatively hard.

Before the first epoxide resin system has cured, the epoxide putty is applied to the primed surfaces of the cable sheath and polyethylene tube to form a joint 5. The joint may then be wiped smooth in a similar manner to a joint in a conventional lead-sheathed cable.

The axial end edges of the joint may be bound with a tape 6 prior to the application of the putty, and primer or at least prior to curing to prevent the formation of thin layers of jointing compound the joint material known in the art as "feathering" and to reduce the incidence of cracks in the completed joint which tend to propagate from such feathered edges.

According to another example of the present invention, a seal between a polyethylene cable and a cable termination box is provided by the following method.

The surface of the polyethylene sheath 3 is prepared by flame polishing as in the first example. The cable termination box 11 is fitted with a brass gland 10 through which the cable can pass. The surfaces of the outer end of the gland are prepared by abrading, etching, scouring or similar processes to render them receptive to an epoxide resin primer. The cable is passed through the gland and the primer is applied to the prepared surfaces of the cable and gland. The primer may be the same as that used in the first example, being a primer that is flexible when cured. Before the primer has cured, an epoxide putty is applied to the primed surfaces to form a seal 5. This seal may be wiped smooth in a similar manner to a plumbed joint. The edges may be bound to prevent "feathering" as in the previous example.

The following table shows the composition of a flexible primer and three putties, all compatible with this primer, with which joints and seals can be made.

| Example | Constituents | Parts by weight |
|---|---|---|
| Primer | Resin: "Epikote" 816'  | 100 |
|  | Hardener: |  |
|  | "Thiokol" LP3 [1] | 80 |
|  | "Epikure" T [1] | 20 |
| I. Putty | Resin: |  |
|  | "Epikote" 828 [1] | 100 |
|  | Thixotropic silica filler | 5 |
|  | Alumina | 240 |
|  | Furfuryl alcohol | 5 |
|  | Polyethylene glycol | 1 |
|  | Hardener: |  |
|  | "Versamid" 115 [1] | 100 |
|  | "Epikure" T [1] | 12 |
|  | Non-leafing type aluminium powder | 200 |
|  | Thixotropic silica filler | 7 |
|  | Alumina | 125 |
| II. Putty | Resin: |  |
|  | "Epikote" 828 [1] | 100 |
|  | Non-leafing type aluminium powder | 227.3 |
|  | Rutile titaniumdioxide | 45.5 |
|  | Thixotropic silica filler | 6 |
|  | Polyethylene glycol | 1 |
|  | Furfuryl alcohol | 5 |
|  | Hardener: |  |
|  | "Versamid" 115 [1] | 100 |
|  | "Epikure" T [1] | 12 |
|  | Thixotropic silica filler | 7 |
|  | China clay | 237.5 |
|  | Rutile titanium dioxide | 25 |
| III. Putty | Resin: |  |
|  | "Epikote" 828 [1] | 100 |
|  | Furfuryl alcohol | 5 |
|  | Polyethylene glycol | 1 |
|  | Thixotropic silica filler | 12 |
|  | Aluminia | 200 |
|  | Hardener: |  |
|  | "Versamid" 125 [1] | 100 |
|  | "Epikure" T [1] | 12 |
|  | Thixotropic silica filler | 15 |
|  | China clay | 250 |

[1] "Epikote," "Epikure," "Thiokol," and "Versamid" are registered trademarks, as mentioned previously.

The constituents of the hardener in each of the above putties are milled together until they are thoroughly inter-mixed.

The putty III is characterised by being substantially unaffected by water in both its cured and uncured states.

The putty I is characterised having a grey hardener mixture and a white resin mixture so that one is assisted in judging the degree to which the two are blended together by the colour of the mixture.

Although a method of making a bond to a polyethylene-sheathed cable has been described, the techniques employed are equally applicable to bonds to other sheathing materials, such as polypropylene or other synthetic plastics material, or even to metallic sheaths. In this case, the flame-polishing treatment may be replaced by a suitable chemically equivalent treatment, for example etching or scouring, to render the surface receptive to the epoxide primer. Hereinafter, a surface so prepared is said to be treated to render it capable of being bonded, Furthermore, the method is obviously not restricted to making bonds with cable sheaths and will be useful in many cases where a peel-resistant bond between an epoxide putty and a metallic or plastics surface is desired.

It is to be understood that the foregoing examples of specific examples of this invention is made by way of example only and is not to be considered as a limitation on its scope.

What we claim is:

1. A method of bonding a filled epoxide putty to a portion of a surface of a body, comprising the steps of treating the portion to render it capable of chemically bonding to a primer to be applied thereto, applying the primer to the treated surface portion, said primer being a first mixture of an epoxide resin and a curing agent for that resin, said resin being such that it is flexible when cured, applying the putty of a second epoxide resin to the primed surface portion, and then causing said primer to be cured.

2. A method as claimed in claim 1, wherein said body is of a synthetic plastics substance.

3. A method as claimed in claim 2, wherein said body is of polyethylene.

4. A method as claimed in claim 2, wherein said body is of polypropylene.

5. A method as claimed in claim 2 wherein said step of treating comprises flame polishing prior to the application of the primer.

6. A method as claimed in claim 1 wherein said body is of a metallic substance.

7. A method as claimed in claim 1, wherein the epoxide putty is a second mixture, components of which are a diglycidyl ether of bisphenol-A, a polyamide curing agent, and a modified aliphatic amine accelerator, and fillers, wherein the components are so proportioned that the mixture is initially in a plastic state.

8. A method as claimed in claim 1 wherein the epoxide putty consists of a mixture a component of which is an epoxide resin and a filler, and another component of which is a curing agent for the epoxide resin.

9. A method as claimed in claim 1 wherein said surface is part of a cable sheath.

10. A method as claimed in claim 9 wherein the epoxide putty provides a seal to retard the ingress of moisture to the cable.

11. A method as claimed in claim 1 for making a seal between a cable and cable gland.

12. A sheathed cable having a joint with a moisture retarding seal comprising a first layer of epoxy resin coated upon said cable and its sheath, the surface of said sheath having been treated to render them capable of being bonded to said first layer of epoxy resin and a second epoxy resin layer in direct adhering contact with said first layer of epoxy resin, both layers containing fillers and curing agents for said resins, said second epoxy resin layer comprising the same or different resin as the first layer but also containing a thixotropic silica filler and aluminum powder in such proportions as to give the mixture a consistency suitable for making wiped joints.

13. The article of claim 12 wherein the sheath is made of a synthetic organic plastic material.

14. The article of claim 13, wherein the sheath is made of polyethylene.

15. The article of claim 13 wherein the sheath is made of polypropylene.

16. The article of claim 12, wherein the sheath is made of metal.

17. The article of claim 12 wherein the surface of said cable has been treated to render it capable of being bonded to said first epoxy resin layer.

18. The article of claim 13, wherein said sheath was treated by flame polishing prior to application of said first epoxy resin layer.

19. The article of claim 18 wherein said first epoxy resin was applied as a primer over the treated sheath, said second epoxy resin was coated on the primed surface and only thereafter was said first epoxy resin cured.

References Cited

UNITED STATES PATENTS

| | | | |
|---|---|---|---|
| 3,395,105 | 7/1968 | Washburn et al. | 156—330 X |
| 2,848,433 | 8/1958 | Eirich | 260—837 |
| 2,864,882 | 12/1958 | Snell | 174—84 |
| 2,868,863 | 1/1959 | Cook | 174—94 |
| 3,035,939 | 5/1962 | Edwards | 260—837 X |
| 3,299,168 | 1/1967 | Payne | 260—837 X |

OTHER REFERENCES

Electrical World, vol. 163, No. 24, June 14, 1965, p. 118, "Epoxy Splice Kits Simplify Subsurface Splicing" by Colbert.

HAROLD ANSHER, Primary Examiner

W. E. HOAG, Assistant Examiner

U.S. Cl. X.R.

117—72, 75, 213, 218; 161—186; 264—272